United States Patent
Herzog et al.

(10) Patent No.: US 12,488,915 B2
(45) Date of Patent: Dec. 2, 2025

(54) APPARATUS FOR TRANSMITTING ELECTRICAL ENERGY WITH A SUPERCONDUCTING CURRENT CARRIER

(71) Applicants: Messer SE & Co. KGaA, Bad Soden (DE); Vision Electric Super Conductors GmbH, Kaiserslautern (DE)

(72) Inventors: Friedhelm Herzog, Krefeld (DE); Thomas Kutz, Bruggen-Born (DE); Wolfgang Reiser, Kaiserslautern (DE); Stefan Huwer, Kaiserslautern (DE)

(73) Assignees: Messer SE & Co. KGaA, Bad Soden (DE); Vision Electric Super Conductors GmbH, Kaiserslautern (DE)

( * ) Notice: Subject to any disclaimer, the term of this patent is extended or adjusted under 35 U.S.C. 154(b) by 235 days.

(21) Appl. No.: 18/352,349

(22) Filed: Jul. 14, 2023

(65) Prior Publication Data

US 2023/0360823 A1  Nov. 9, 2023

Related U.S. Application Data

(63) Continuation of application No. PCT/EP2021/078850, filed on Oct. 18, 2021.

(30) Foreign Application Priority Data

Nov. 18, 2020 (DE) .................... 10 2020 007 043.4

(51) Int. Cl.
H01B 12/00 (2006.01)
H01B 12/14 (2006.01)
H01B 12/16 (2006.01)

(52) U.S. Cl.
CPC ............. *H01B 12/16* (2013.01); *H01B 12/14* (2013.01)

(58) Field of Classification Search
CPC .................................. H01B 12/16; H01B 12/14
See application file for complete search history.

(56) References Cited

U.S. PATENT DOCUMENTS 3,343,035 A    9/1967  Garwin
3,917,897 A *  11/1975 Hildebrandt ........... H01B 12/16
                                                174/15.5

(Continued)

FOREIGN PATENT DOCUMENTS

EP    1850354 A1   10/2007
EP    2328156 A1   6/2011

(Continued)

OTHER PUBLICATIONS

International Search Report and Written Opinion in PCT/EP2021/078850, dated Feb. 7, 2022, 6 pages.

*Primary Examiner* — Pete T Lee
(74) *Attorney, Agent, or Firm* — Andrus Intellectual Property Law, LLP

(57) ABSTRACT

Apparatus for transmitting electrical energy with a superconducting current carrier, in which the superconducting current carrier to be cooled is accommodated in a first cooling channel, which first cooling channel is connected by way of a coolant feed line to a supply device for a first cooling medium and is surrounded by at least one second cooling channel, for conducting through a second cooling medium, which is flow-connected to a coolant-discharge line for heated second cooling medium, wherein a supercooled, liquefied gas is used as the first cooling medium, is characterized according to the invention in that a liquefied gas is used as the second cooling medium and the second (Continued)

cooling channel is equipped with means for removing a gas phase occurring due to evaporation of the second cooling medium.

11 Claims, 3 Drawing Sheets

(56) References Cited

U.S. PATENT DOCUMENTS

| | | | | |
|---|---|---|---|---|
| 4,020,274 | A * | 4/1977 | Dean | H02G 15/34 |
| | | | | 174/15.5 |
| 4,048,437 | A * | 9/1977 | Vander Arend | H01B 12/16 |
| | | | | 174/15.5 |
| 6,732,536 | B1 | 5/2004 | Bonaquist et al. | |
| 7,453,041 | B2 * | 11/2008 | Maguire | H01B 12/16 |
| | | | | 174/15.4 |
| 8,280,467 | B2 * | 10/2012 | Yuan | H10N 60/00 |
| | | | | 505/220 |
| 11,362,503 | B2 | 6/2022 | Herzog et al. | |
| 2006/0150639 | A1 | 7/2006 | Zia et al. | |

FOREIGN PATENT DOCUMENTS

| | | |
|---|---|---|
| EP | 2608223 A1 | 6/2013 |
| EP | 2793240 B1 | 5/2016 |
| EP | 3017238 A1 | 5/2016 |
| JP | S5071290 A | 6/1975 |
| WO | 2007005091 A1 | 1/2007 |
| WO | 2014026873 A2 | 2/2014 |
| WO | 2019146269 A1 | 8/2019 |

* cited by examiner

APPARATUS FOR TRANSMITTING ELECTRICAL ENERGY WITH A SUPERCONDUCTING CURRENT CARRIER

CROSS-REFERENCE TO RELATED APPLICATIONS

The present application is a continuation of international application PCT/EP2021/078850, filed Oct. 18, 2021, which international application was published on May 27, 2022, as International Publication WO 2022/106131 A1. The international application claims priority to German Patent Application No. 10 2020 007 043.4 filed Nov. 18, 2020. The above-noted applications are hereby incorporated herein by reference.

FIELD

The invention relates to an apparatus for transmitting electrical energy with a superconducting cable.

BACKGROUND

A superconducting current carrier, in particular a superconducting cable or a superconducting conductor rail, comprises at least one electrical conductor element, which at a sufficiently low temperature (transition temperature, $T_c$) goes over into the superconducting state. Transition temperatures of superconductors vary within a wide range and range from $T_c<10$ K in the case of classical metallic superconductors to values of $T_c>100$ K in the case of ceramic high-temperature superconductors. The discovery and industrial exploitation of superconductors with an even higher transition temperature in the near future is not ruled out.

To maintain the superconducting state, the superconducting cable must be cooled with a suitable cooling medium. To implement effective cooling, the superconducting current carrier is for example accommodated in a tubular or rectangular cooling channel (cryostat), through which the cooling medium is passed during operation. Superconducting current carriers of this type are widely known and are described for example in EP 2 328 156 A1, EP 2 608 223 A1, or EP 2 793 240 B1.

Serving as a cooling medium for cooling superconducting current carriers is for example a supercooled, liquefied gas, such as liquid nitrogen, liquid oxygen, liquid hydrogen, liquefied natural gas or liquefied noble gas, in particular liquid helium. A "supercooled liquefied gas" is understood here as meaning a gas which is at a temperature below the boiling temperature under the respectively prevailing pressure. By contrast with the use of a non-supercooled liquefied gas, that is to say a liquefied gas at the corresponding boiling temperature, the take-up of heat initially only brings about a temperature increase of the liquefied gas, without a change of the state of aggregation occurring. Examples of such cooling systems are described in the documents U.S. Pat. No. 6,732,536 B1, WO 2007/005091 A1, EP 1 850 354 A1, US 2006/0150639 A1 or EP 3 017 238 A1. In the case of all these systems, the liquefied gas is supercooled and fed to the superconducting current carrier by means of a pump. After cooling has taken place, the cooling medium is returned to the supercooler, in order to remove heat that has in the meantime been taken up. The heat input during the cooling of superconducting current carriers takes place predominantly through the feed pump and/or through heat input from the surroundings, for which reason superconducting current carriers are generally provided with a good thermal insulation, for example a vacuum insulation.

The known systems have disadvantages, which are manifested in particular in the case of long cooling sections. In order to be able to balance out the heat input, with increasing length of the current carrier more cooling medium must be passed through the line. The increasing volumetric flow can however only be achieved with a greater flow cross section and/or with a greater flow rate. In the former case, the costs of the arrangement increase rapidly to an extent that is no longer commercially acceptable, in the latter case the high flow rate also increases the dissipative heat input as a result of the friction of the cooling medium on the inner wall of the pipeline and thereby reduces the efficiency of the cooling.

For these reasons, arrangements for transmitting electrical energy with a superconducting current carrier are usually divided into cooling sections that are separate from one another in terms of flow, which respectively have a length of for example one kilometre and for each of which a dedicated circulatory cooling system is used. However, the expenditure on equipment for creating an electrical energy transmission system of a relatively great length in this way is considerable.

WO 2014 026 873 A1 discloses a method for cooling objects, in particular superconducting cables, in which a supercooled cryogenic cooling medium is passed through an annular channel laid around a superconducting cable. The cooling takes place by means of two storage containers at the two ends of the cable, from which the cooling medium is conducted through the annular channel in alternating directions. Because the cooling medium is conducted in alternating directions, there is no need for an independent return line through which additional heat is input into the system, but the requirement for two storage containers leads to a high expenditure on equipment.

U.S. Pat. No. 7,453,041 B1 describes an arrangement for cooling a superconducting cable in which a superconducting cable is accommodated coaxially in a first (inner) tubular channel, which is connected to a feed for a cooling medium. The first channel is accommodated coaxially within a second (outer) tubular channel, which is flow-connected at at least one end face of the arrangement to the inner channel and is equipped with a discharge line for the cooling medium. During the operation of the arrangement, a cooling medium at a temperature below the transition temperature of the superconducting cable material, for example supercooled liquid nitrogen, is conducted through the inner channel and cools the superconducting cable. The cooling medium that is subsequently returned by way of the outer channel acts as a heat shield, which shields the inner channel from the input of heat from the surroundings. In this way, the input of heat over the overall length of the cable can be reduced and the arrangement can consequently be made to extend over greater lengths.

With this setup, it is problematic however that, to maintain the circulatory function and the cooling efficiency, the nitrogen in both channels must always be kept in the liquid state, which requires considerable expenditure on equipment and reduces the effective length of a cable section equipped with a cooling system.

SUMMARY

The invention is therefore based on the object of providing an apparatus for transmitting electrical energy with a superconducting current carrier that allows efficient cooling even over relatively long sections of line with comparatively low expenditure on equipment.

This object is achieved by an apparatus with the features of Patent claim 1. Advantageous configurations of the invention are specified in the subclaims.

An apparatus for transmitting electrical energy with a superconducting current carrier, that is to say in particular a cable or a conductor rail, in which the current carrier to be cooled is accommodated in a first cooling channel, which first cooling channel is connected by way of a coolant feed line to a supply device for a first cooling medium and is equipped with a heat shield, which surrounds the first cooling channel and is thermally connected to at least one second cooling channel, intended for conducting through a second cooling medium, wherein a supercooled, liquefied gas is used as the first cooling medium, is therefore characterized according to the invention in that a liquefied gas is used as the second cooling medium and the at least one second cooling channel is equipped with at least one gas phase separator.

An apparatus according to the invention therefore comprises a first (inner) cooling channel, in which a superconducting current carrier to be cooled is arranged, and a heat shield, which surrounds the first cooling channel and is thermally connected to a second cooling channel, through which a second cooling medium flows. The heat shield is for example the second cooling channel itself, arranged coaxially or in some other way around the first cooling channel, or a construction, for example a tubular construction, of a material with good heat conduction which surrounds the first cooling channel and is thermally connected to one or more channels through which the second cooling medium flows. Serving for cooling the superconducting current carrier is a supercooled, liquefied gas, such as supercooled liquefied nitrogen, supercooled liquefied oxygen, supercooled liquefied hydrogen, supercooled liquefied natural gas or noble gas, which is adjusted in its temperature in such a way that in the inner cooling channel it always remains in the liquid state and at a temperature below the transition temperature of the superconducting cable material.

The first cooling medium is introduced into the first cooling channel at a feeding point, which is for example at a head end of an apparatus according to the invention or in the region midway between the two head ends of an apparatus according to the invention. The first cooling medium may in this case also be circulated and made to undergo supercooling each time it enters the first cooling channel.

A liquefied gas is likewise used for the cooling medium used in the second cooling channel or the second cooling channels and may be the same gas or a different gas than the gas used in the first cooling channel. However, it is at a higher temperature than the cooling medium in the first cooling channel and may at least partially evaporate as a result of the heat input from the surroundings; as a difference from apparatuses according to the prior art, it is therefore not necessary to keep the cooling medium in the second cooling channel in the liquid state the whole time—for instance by cooling to a corresponding temperature or by applying a corresponding pressure—as a result of which cooling medium can be saved to a not inconsiderable extent. Rather, a gas phase in the gas phase separator or in the gas phase separators, occurring on account of the evaporation of cooling medium in the second cooling channel, is separated from the still liquid second cooling medium and removed from the second cooling channel by way of an exhaust-gas line. The gas phase is subsequently let out into the surrounding atmosphere by way of the exhaust-gas line or passed on for some other use. The exhaust-gas line may also run at least in some sections through a third cooling channel, which runs coaxially around the second cooling channel and in this case represents an additional heat shield.

The separated-off liquid phase remains in the second cooling channel or is returned again into the stream of the second cooling medium. After passing through the second cooling channel, the liquid phase is used once again—while replacing the removed gas phase component and with renewed supercooling—for cooling the superconducting cable in the first cooling channel, or it is passed on for some other use, for example for cooling a power lead connected to the superconducting cable.

Provided between the first cooling channel and the heat shield and/or between the first cooling channel and the second cooling channel is a layer with a low heat transfer coefficient, which only allows lowest possible heat transfer from the second cooling channel into the first. A thermal insulation, for example a vacuum insulation, encloses the heat shield and the second cooling channel or the second cooling channels, or the second cooling channel if the latter acts as a heat shield in coaxial arrangement with respect to the first cooling channel.

The gas phase separator preferably comprises a container in which the separation of the liquid phase and the gas phase takes place on account of gravitational force, the gas phase therefore collects in a geodetically upper portion of the container and is removed from there by way of an exhaust-gas line. However, other mechanisms for phase separation can be advantageously used in the gas phase separator or in the gas phase separators, for example a temperature- or pressure-controlled fitting or a liquid-tight, but gas-permeable membrane. A plurality of gas phase separators arranged at a distance from one another in the longitudinal direction of the second cooling channel are also conceivable according to the invention.

The gas phase separator should be arranged within an outer insulation of the apparatus according to the invention which surrounds the second cooling channel and possibly the third cooling channel, or the gas phase separator has a highly effective insulation of its own, for instance an arrangement within a vacuum chamber.

An advantageous configuration of the invention is characterized in that supercooled second cooling medium is used as the first cooling medium.

In the case of this configuration, the first cooling medium and the second cooling medium consist of the same substance, for example liquid nitrogen, and can also be taken from the same storage container. However, before being introduced into the first cooling channel, the cooling medium is supercooled—or is constantly circulated and supercooled before each time it re-enters the first cooling channel—and also within the first cooling channel is always in the supercooled, liquid state. The cooling medium introduced from the first cooling channel into the second cooling channel heats up on account of the heat input from the surroundings by a temperature difference of for example 2 K to 10 K. It may in this case also reach the temperature of its boiling point and partially evaporate. In the second cooling channel, the cooling medium serves as a heat shield for the cooling medium in the first cooling channel, which to this extent takes up a smaller amount of heat.

The still liquid cooling medium from the second cooling channel may in this case be passed on in particular for some other cooling task, for example for cooling a power lead. A particularly preferred configuration of the invention envisages however providing between the first cooling channel and the second cooling channel at least one flow connection for introducing cooling medium from the first cooling channel into the second cooling channel. In this case, the cooling medium passed through the first cooling channel is therefore identical to the cooling medium passed through the second cooling channel. The cooling medium is therefore in the supercooled state when it is fed to the first cooling channel, in which it undertakes the cooling of the superconducting current carrier, and goes by way of the flow connection, or by way of a plurality of flow connections, into the second cooling channel, in which it acts as a heat shield for the first cooling channel or cools a heat shield thermally connected to the second cooling channel or the second cooling channels. In the second cooling channel, at least part of the cooling medium may evaporate due to the heat input from the surroundings. The evaporated cooling medium is separated from the liquid phase and removed. The cooling medium remaining in the liquid state passes through the second cooling channel and may subsequently be used once again, for example it is brought to the operating temperature required for cooling the superconducting current carrier together with fresh cooling medium, replacing the removed gas phase, in a supercooler and is fed once again into the first cooling channel.

The apparatus according to the invention has two head portions, which delimit the cooling device for the superconducting current carrier. In a preferred configuration of the invention, a flow connection between the first cooling channel and the second cooling channel, by way of which cooling medium from the first cooling channel enters the second cooling channel during the operation of the apparatus, is in this case provided at least in the region of a head portion. It is ensured by this arrangement at the end of the flow connection that the first cooling medium is passed along the superconducting current carrier to the head portion thereof, and as a result sufficient cooling of the entire current carrier takes place. The cooling medium feed line for introducing the first cooling medium may in this case be arranged at the opposite head portion or at some other point, for instance midway between the two head portions. Also conceivable within the scope of the invention in particular is an arrangement in which the coolant feed line opens into the first cooling channel for instance midway between the two head portions, and there is a flow connection between the cooling channels at each of both head ends. However, the flow connection or at least one flow connection may also be provided at any other desired location between the head ends of the apparatus.

As an alternative or in addition to the configuration above, a plurality of flow connections are provided between the first cooling channel and the second cooling channel, arranged at a distance from one another in the longitudinal direction of the cooling channels.

In this case, therefore, provided over the length of the apparatus, at a distance from one another in the longitudinal extent of the apparatus, are a plurality of flow connections, through which in each case a small partial stream of the cooling medium flowing through the first cooling channel flows into the second cooling channel. The first cooling medium is in this case continuously replaced by fresh supercooled liquefied gas from the cooling medium feed line. As a result, the low temperature required to maintain the superconduction is preserved in the inner cooling channel. At the same time, with increasing distance from the feeding point of the fresh cooling medium, the flow rate of the cooling medium flowing in the first channel decreases, whereby the input of heat as a result of the friction of the cooling medium on the walls of the line is reduced. The number and diameter of the through-openings or lines provided as flow connections between the first cooling channel and the second cooling channel are in this case determined in particular on the basis of the length of the apparatus and should be chosen such that sufficient cooling of the superconducting current carrier is ensured even at the point furthest away from the feeding point.

In an again advantageous configuration of the invention, the flow connection between the first cooling channel and at least one second cooling channel is equipped with fittings for controlling the through-flow of cooling medium. In this way, the supply of the cooling medium can be adapted exactly to the respective requirements, for example to the heat input from the surroundings, the ambient temperature, etc.

Outside the head portions of the apparatus, the superconducting current carrier is either connected to an electrical element, for instance a normally conducting power lead or a load, for example a magnet or a machine, or there is a further apparatus according to the invention there, by means of which the cooling of a further section of the superconducting current carrier takes place.

In an again advantageous configuration of the invention, a number of apparatuses according to the invention are combined to form a larger arrangement for transmitting electrical energy, similar to the arrangement described in U.S. Pat. No. 7,453,041 B2. For this purpose, the apparatuses are arranged in series one behind the other and are used for cooling a superconducting current carrier of a corresponding length. In this way, the operation of very long superconducting current carriers of 10 km to 100 km in length or more is also conceivable.

BRIEF DESCRIPTION OF THE DRAWINGS

Exemplary embodiments of the invention are to be explained more specifically on the basis of the drawing, in which schematically.

DETAILED DESCRIPTION

Figure 1:
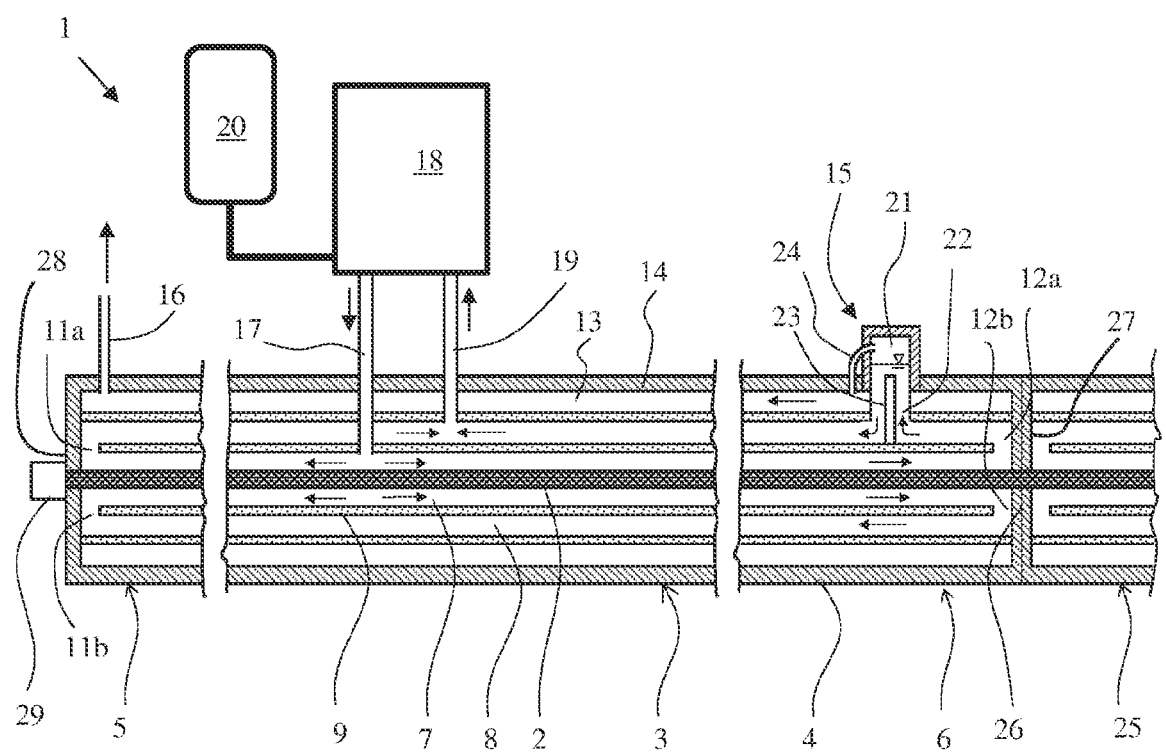
FIG. 1 shows the detail of an apparatus according to the invention in a first embodiment in longitudinal section.

The apparatus 1 shown in FIG. 1 comprises a superconducting current carrier, which in the exemplary embodiments shown here is a superconducting cable 2 or at least a section of a superconducting current carrier 2, which is accommodated in a cooling arrangement 3 for cooling the superconductor 2. The cooling arrangement 3 has a tubular or box-shaped housing 4, which has for example a length of several hundred metres to several kilometres and ends at head portions 5, 6 at both ends.

The superconducting cable 2 is arranged substantially along the axis of the housing 3. Surrounding it, for example coaxially in relation to the superconducting cable 2, runs a first tubular or box-shaped cooling channel 7 and surrounding it, for example coaxially in relation to it, is a second tubular or box-shaped cooling channel 8, which cooling channels are separated from one another by a casing 9 of a material with good thermal insulation. In the region of the head portions 5, 6, the cooling channels 7, 8 are connected to one another in terms of flow at lead-throughs 11a, 11b; 12a, 12b; otherwise, in the exemplary embodiment shown in FIG. 1, there is no flow connection between the cooling channels 7, 8.

Arranged radially outside on the second cooling channel 8 is a gas discharge channel 13, which in turn is enclosed by a thermal insulation, for example a vacuum insulation 14. There is no flow connection between the second cooling channel 8 and the gas discharge channel 13, with the exception of a flow connection in the region of a gas phase separator 15 described more specifically below. The gas discharge channel 13 is flow-connected to an exhaust-gas line 16, which in the exemplary embodiment is provided in the region of a head portion, here the head portion 5.

The apparatus 1 also has a coolant feed line 17, which establishes a flow connection between a cooling device 18 and the first cooling channel 7. The cooling device 18 is for example a supercooler for supercooling a liquefied cryogenic medium, for example liquid nitrogen. The cooling device 18 is also flow-connected by way of a return line 19 to the second cooling channel 8. Furthermore, the cooling device 18 is connected to a storage container 20, from which fresh cooling medium can be supplied if and when required during the operation of the apparatus 1.

The gas phase separator 15 is arranged at an upper part—seen geodetically—of the housing 3 and comprises a container 21, which is flow-connected by way of a feed line 22 and a return line 23 to the second cooling channel 8. Furthermore, a gas line 23, which opens into the gas discharge channel 13, opens out from an upper portion of the container 21.

The apparatus 1 is part of an overall arrangement for transmitting electrical energy. In the exemplary embodiment shown here, the head portion 6 is adjoined by an identical apparatus 25, which is only indicated here, the superconducting cable 2 being led through terminating walls 26, 27 at the ends of both apparatuses 1, 25. Instead of an apparatus 25, other electrical elements may however also adjoin the head portions 5, 6, as shown here by way of example in the region of the head portion 5. There, the superconducting cable 2 is led through a terminating end wall 28 and is connected to an electrical element 29, which may be for example an electrical load or a power lead or likewise an apparatus according to the invention.

During the operation of the apparatus 1, the superconducting cable 2 is cooled with a supercooled liquefied gas, for example supercooled nitrogen, supercooled LNG, supercooled liquefied oxygen or a supercooled liquefied noble gas. For this purpose, the cooling medium is taken from the storage container 20, in the cooling device 18 is brought to a temperature below its boiling point, that is to say supercooled, and is fed into the first cooling channel 7 by way of the coolant feed line 17 by means of a feeding device not shown here, for instance a pump. The cooling medium passes through the cooling channel 7 in both directions up to the head portions 5, 6 at a temperature at which the superconducting conductor elements of the superconducting cable 2 are in the superconducting state. In the region of the head portions 5, 6, the cooling medium flows into the second cooling channel 8, passes through it from both head portions 5, 6 and flows into the return line 19, through which in the exemplary embodiment shown here it is fed to the cooling device 18, cooled there and fed once again into the first cooling channel 7. If the coolant feed line 17 is in the region of a head portion 5, 6, the cooling medium only flows through the first cooling channel 7 in the direction of the other head portion 6, 5.

The cooling medium in the second cooling channel 8 serves as a heat shield against the penetration of heat from the surroundings. The heat input causes an increase in the temperature of the cooling medium in the cooling channel 8 up to its boiling temperature and it finally partly evaporates. Therefore, in the second cooling channel 8, the cooling medium takes the form of a phase mixture made up of liquid and gaseous constituents. The gas phase contained in the cooling medium is separated off from the liquid phase in the gas phase separator 15. While the liquid phase is returned to the cooling device 18, the separated-off gas phase passes through the gas discharge channel 13 and finally escapes by way of the exhaust-gas line 16. In an alternative configuration, there is no gas discharge channel 13 and the gas phase is conducted out of the gas phase separator 15 directly into the surrounding atmosphere. Passing the gaseous cooling medium through the gas discharge channel 13 has the effect that the shielding from heat input from outside is further improved. The gaseous cooling medium is finally let out into the surrounding atmosphere or is passed on for some other use. Accordingly, part of the cooling medium circulated by way of the cooling channels 7, 8 and the cooling device 18 is lost and must be replaced by fresh cooling medium from the storage tank 20.

Instead of the coaxial arrangement of the first cooling channel 7 and the second cooling channel 8 shown here, a construction made of a material with good heat conduction, which is arranged around the first cooling channel 7, for example in the form of a tube casing arranged around the first cooling channel 7, may otherwise be provided as a heat shield. In this case, the second cooling channel is configured as a line which runs parallel to the first cooling channel within the vacuum insulation 14 and is thermally connected to the construction mentioned; in this case, a number of second cooling channels that are thermally connected to the construction may also be used within the vacuum insulation 14.

Figure 2:
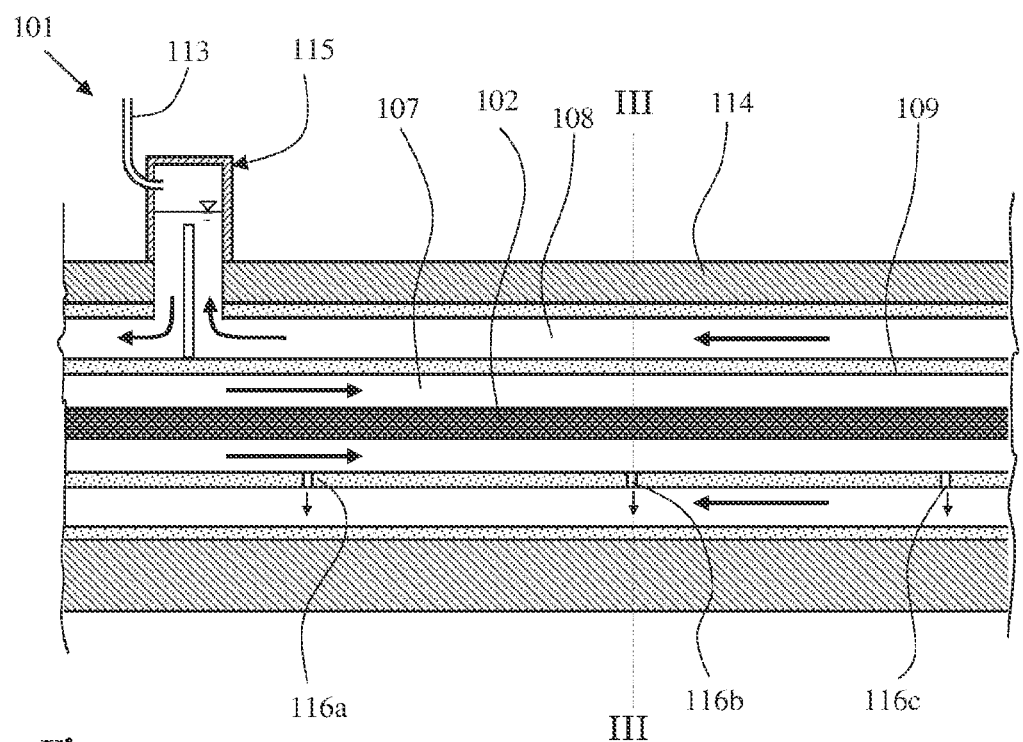
FIG. 2 shows the detail of an apparatus according to the invention in another embodiment in longitudinal section.
Figure 3:
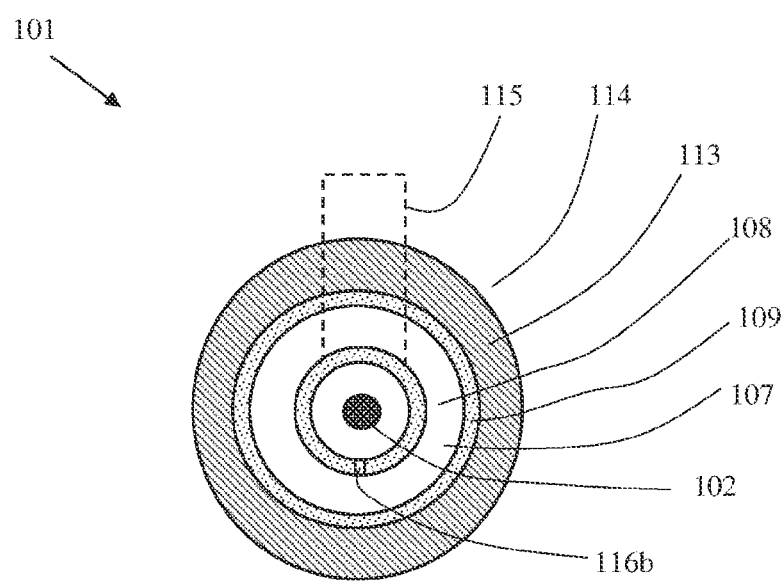
FIG. 3 shows the apparatus from FIG. 2 in cross section along the sectional line III-III in FIG. 1.

The apparatus 101 shown in FIGS. 2 and 3 likewise has a housing 103 with a first cooling channel 107, coaxially enclosing a superconducting current carrier such as for example a superconducting cable 102, and a second cooling channel 108, arranged coaxially around the inner cooling channel 107, which cooling channels are separated from one another by a casing 109 of a material with good thermal insulation and surrounded by a vacuum insulation 114. In the exemplary embodiment shown in FIG. 2, provided between the cooling channel 108 and the gas discharge channel 116 in terms of flow are a plurality of gas phase separators, arranged at a distance from one another along the cooling channel 108, of which however only one gas phase separator 115 is shown here. The gas phase separator 115 is equipped with an exhaust-gas line for removing the gas phase separated off in the gas phase separator 115.

As a difference from the apparatus 1, however, there is not a flow connection between the cooling channels 7, 8 in the region of the head portions of the housing 103, but by way of lead-throughs 116a, 116b, 116c in the casing 109 arranged at a distance from one another in the longitudinal direction of the housing 103, for example at a distance of 100 m to 1000 m; otherwise, the apparatus 101 is constructed identically to the apparatus 1.

During the operation of the apparatus 101, cooling medium flows out of a coolant feed, not shown here, in the direction of the arrow through the cooling channel 107 and cools the superconducting cable 102. In this case, a small partial stream of the cooling medium respectively flows off into the cooling channel 108 through the lead-throughs 116a, 116b, 116c. As a result, the mass flow of the cooling medium flowing through the cooling channel 107 decreases with increasing distance from the coolant feed, and the flow rate and the heat input caused by friction on the inner wall of the casing 9 decrease.

The cooling medium flows through the second cooling channel 108 in the direction of a coolant discharge line not shown here. As it does so, it takes up heat from the surroundings and partially evaporates, that is to say within the second cooling channel 108 therefore takes the form of a phase mixture made up of liquid and gaseous constituents. The gas phase contained in the cooling medium is separated off from the still liquid cooling medium in the way described above in a plurality of gas phase separators 115, which are arranged at regular intervals on the cooling channel 108, and the gas phase separated off from the liquid phase is conducted by way of the exhaust-gas line 113 into the surrounding atmosphere. The still liquid cooling medium is cooled for example in the way described above in a cooling device and is fed once again to the cooling channel 107, but it may also be used in some other way, for example for cooling a non-superconducting power lead (not shown here) connected to the superconducting cable 102.

Figure 4:
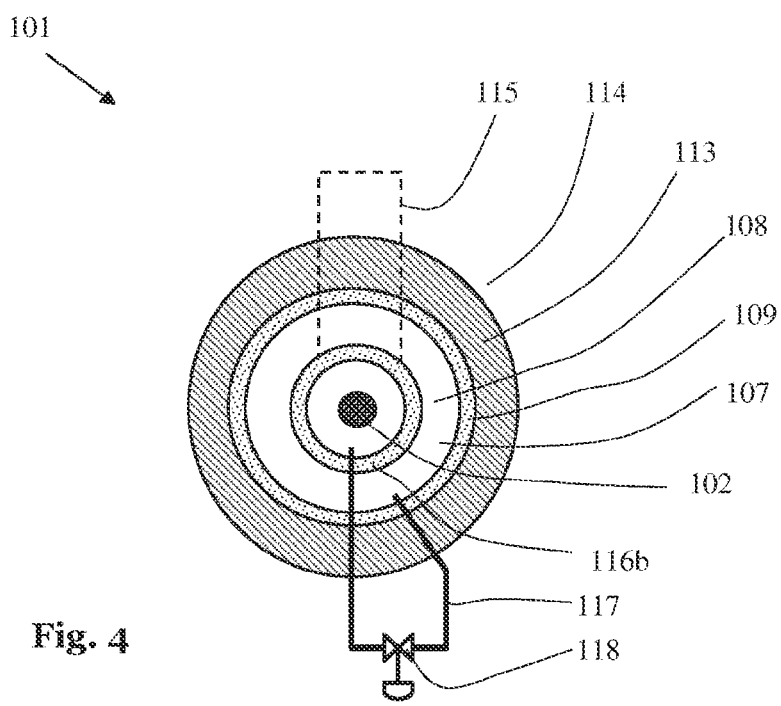
FIG. 4 shows an apparatus according to the invention in a further embodiment in cross section.

The exemplary embodiment shown in FIG. 4 differs from the exemplary embodiment shown in FIG. 3 only in that the flow connections between the cooling channels 107, 108 are not realized by way of simple lead-throughs 116a, 116b, 116c, but instead of a lead-through 116a, 116b, 116c there is a line 117, which by means of a fitting 118 can be controlled on the basis of a prescribed program or in dependence on measured parameters, such as for example the ambient temperature or the temperature of the cooling medium in one of the cooling channels 117, 118.

LIST OF REFERENCE NUMERALS

1 Apparatus
2 Superconducting cable
3 Cooling arrangement
4 Housing
5 Head portion
6 Head portion
7 First cooling channel
8 Second cooling channel
9 Casing
10 -
11a, 11b Lead-through
12a, 12b Lead-through
13 Gas discharge channel
14 Vacuum insulation
15 Gas phase separator
16 Exhaust-gas line
17 Coolant feed line
18 Cooling device
19 Return line
20 Storage container
21 Container
22 Feed line
23 Return line
24 Gas line
25 Apparatus
26 Terminating wall
27 Terminating wall
28 Terminating wall
29 Electrical element
101 Apparatus
102 Superconducting cable
103 Housing
104 -
105 -
106 -
107 First cooling channel
108 Second cooling channel
109 Casing
110 -
111 -
112 -
113 Exhaust-gas line
114 Vacuum insulation
115 Gas phase separator
116a, 116b, 116c Lead-throughs
117 Line
118 Fitting

The invention claimed is:

1. An apparatus for transmitting electrical energy with a superconducting current carrier, in which the current carrier to be cooled is accommodated in a first cooling channel, which first cooling channel is connected by way of a coolant feed line to a supply device for a first cooling medium and is equipped with a heat shield, which surrounds the first cooling channel and is thermally connected to at least one second cooling channel, through which a second cooling medium flows, wherein a supercooled, liquefied gas is used as the first cooling medium, wherein a liquefied gas is used as the second cooling medium, and the at least one second cooling channel is equipped with at least one gas phase separator; and wherein the at least one gas phase separator comprises a container which is flow-connected to the at least one second cooling channel and the geodetically upper portion of which is flow-connected to an exhaust-gas line for removing the gas phase.

2. The apparatus according to claim 1, wherein the gas phase is discharged in the at least one gas phase separator by way of a float valve, a fitting or a liquid-tight, but gas-permeable membrane.

3. The apparatus according to claim 1, wherein supercooled second cooling medium is used as the first cooling medium.

4. The apparatus according to claim 1, wherein between the first cooling channel and the at least one second cooling channel, at least one flow connection is provided for introducing cooling medium from the first cooling channel into the at least one second cooling channel.

5. The apparatus according to claim 4, wherein the at least one flow connection between the first cooling channel and the at least one second cooling channel is arranged in the region of a head portion of the apparatus that is at a distance from the coolant feed line of the first cooling channel.

6. The apparatus according to claim 4, wherein between the first cooling channel and the at least one second cooling channel, a plurality of flow connections are provided, arranged at a distance from one another in the longitudinal direction of the cooling channels.

7. The apparatus according to claim 4, wherein the at least one flow connection between the first cooling channel and the at least one second cooling channel is equipped with fittings for controlling the through-flow of cooling medium.

8. An arrangement for transmitting electrical energy with a superconducting current carrier in which a plurality of apparatuses according to claim 1 are connected to one another.

9. The apparatus according to claim 1, wherein the first cooling medium and the second cooling medium consist of the same substance.

10. An apparatus for transmitting electrical energy with a superconducting current carrier, in which the current carrier to be cooled is accommodated in a first cooling channel, which first cooling channel is connected by way of a coolant feed line to a supply device for a first cooling medium and is equipped with a heat shield, which surrounds the first cooling channel and is thermally connected to at least one second cooling channel, through which a second cooling medium flows, wherein a supercooled, liquefied gas is used as the first cooling medium;
   wherein a liquefied gas is used as the second cooling medium, and the at least one second cooling channel is equipped with at least one gas phase separator; and
   wherein the gas phase is discharged in the at least one gas phase separator by way of a float valve, a fitting or a liquid-tight, but gas-permeable membrane.

11. An apparatus for transmitting electrical energy with a superconducting current carrier, in which the current carrier to be cooled is accommodated in a first cooling channel, which first cooling channel is connected by way of a coolant feed line to a supply device for a first cooling medium and is equipped with a heat shield, which surrounds the first cooling channel and is thermally connected to at least one second cooling channel, through which a second cooling medium flows, wherein a supercooled, liquefied gas is used as the first cooling medium;
   wherein a liquefied gas is used as the second cooling medium, and the at least one second cooling channel is equipped with at least one gas phase separator;
   wherein between the first cooling channel and the at least one second cooling channel, at least one flow connection is provided for introducing cooling medium from the first cooling channel into the at least one second cooling channel; and
   wherein the at least one flow connection between the first cooling channel and the at least one second cooling channel is equipped with fittings for controlling the through-flow of cooling medium.

* * * * *